(12) United States Patent
Petrakos et al.

(10) Patent No.: US 6,594,491 B2
(45) Date of Patent: *Jul. 15, 2003

(54) METHOD AND SYSTEM FOR GENERATING INFORMATION-BEARING AUDIBLE TONES

(75) Inventors: Stephanie Petrakos, Boulder, CO (US); Edward A. Youngs, Boulder, CO (US)

(73) Assignee: Qwest Communications International Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,376

(22) Filed: Apr. 22, 1998

(65) Prior Publication Data

US 2001/0053706 A1 Dec. 20, 2001

(51) Int. Cl.[7] ................................................. H04Q 7/00
(52) U.S. Cl. ...................... 455/434; 455/458; 455/566
(58) Field of Search ................................. 455/422, 406, 455/407, 408, 432, 434, 435, 458, 550, 566, 567, 575, 229.1

(56) References Cited

U.S. PATENT DOCUMENTS

| 4,916,728 A | * | 4/1990 | Blair | 455/432 |
| 5,020,091 A | * | 5/1991 | Krolopp et al. | 455/434 |
| 5,086,290 A | * | 2/1992 | Murray et al. | 455/229.1 |
| 5,442,806 A | * | 8/1995 | Barber et al. | 455/435 |
| 5,832,386 A | * | 11/1998 | Nojima et al. | 455/567 |
| 6,070,055 A | * | 5/2000 | Uchida | 455/566 |

* cited by examiner

Primary Examiner—Thanh Cong Le
(74) Attorney, Agent, or Firm—Townsend and Townsend and Crew, LLP

(57) ABSTRACT

A method and system for generating one of a first and second audible tone in a telephony system including a telephony device responsive to a first signal to generate the first audible tone and responsive to a second signal to generate the second audible tone includes receiving an information signal from the telephony system and a user initiated signal from the telephony device indicating a desire to initiate a call from the telephony device. A processor processes the information signal and the user initiated signal to determine at least one of billing rate information, available services, and service control procedures associated with the desired call and generate one of the first and second signals. A dial tone generator generates one of the first and second audible tones in response to one of the first and second signals, respectively.

30 Claims, 4 Drawing Sheets

METHOD AND SYSTEM FOR GENERATING INFORMATION-BEARING AUDIBLE TONES

TECHNICAL FIELD

This invention relates to methods and systems for generating information-bearing audible tones.

BACKGROUND ART

The basic purpose of a dial tone is to inform the user of the availability of service. In a wireline system, the dial tone indicates that facilities are available to receive digits.

However, there is no such dial tone available to users of a wireless system that provides an indication to the user that the radio signal strength available is sufficient to make a call attempt. Furthermore, the dial tone does not provide any other kind of information, such as whether the communications service is being offered by the user's "home" service provider or by an "interconnected" or "roaming" service provider that may provide different services, employ alternative control procedures, or charge higher rates.

Thus, there exists a need for generating dial tones that provide additional information to the user.

DISCLOSURE OF THE INVENTION

It is a general object of the present invention to provide a method and system for generating information-bearing audible dial tones.

It is another object of the present invention to provide an information-bearing dial tone that is easily recognizable as a dial tone.

It is yet another object of the present invention to provide an information-bearing dial tone that can be detected by automated equipment such as modems.

Still further, it is an object of the present invention to provide an information-bearing dial tone that satisfies the telecommunications industry standard for tones.

In carrying out the above objects and other objects, features, and advantages of the present invention, a method is provided for generating one of a first and second audible tone in a telephony system including a telephony device responsive to a first signal to generate the first audible tone and responsive to a second signal to generate the second audible tone. The method includes receiving an information signal from the telephony system and receiving a user initiated signal from the telephony device indicating a desire to initiate a call from the telephony device. The method also includes processing the information signal and the user initiated signal to determine at least one of billing rate information, available services, and service control procedures associated with the desired call and generate one of the first and second signals. Still further, the method includes generating one of the first and second audible tones in response to one of the first and second signals, respectively.

In further carrying out the above objects and other objects, features, and advantages of the present invention, a system is also provided for carrying out the steps of the above described method. The system includes means for receiving an information signal from the telephony system and means for receiving a user initiated signal from the telephony device indicating a desire to initiate a call from the telephony device. The system also includes a processor for processing the information signal and the user initiated signal to determine at least one of billing rate information, available services, and service control procedures associated with the desired call and generate one of the first and second signals. The system further includes a dial tone generator for generating one of the first and second audible tones in response to one of the first and second signals, respectively.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
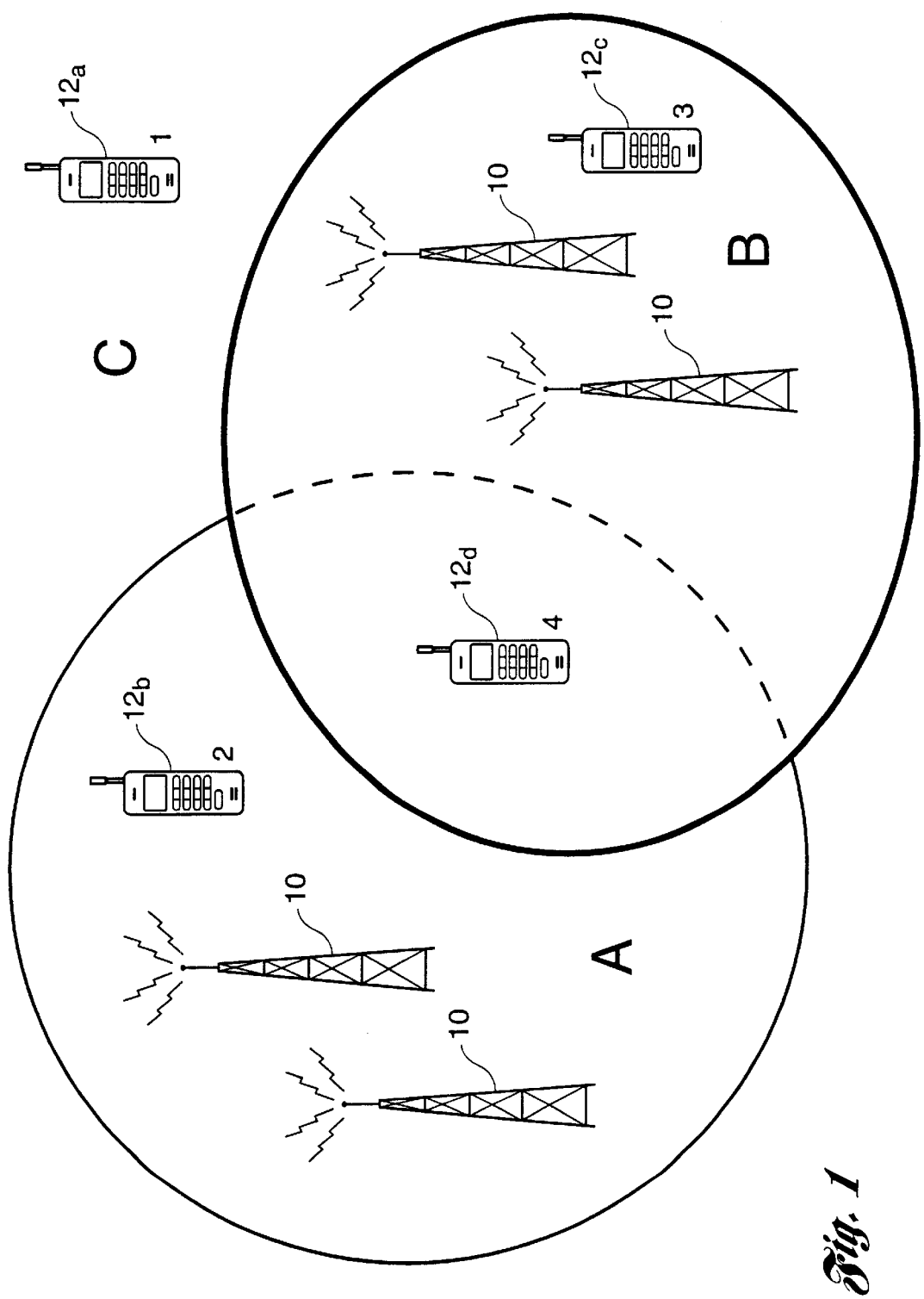
FIG. 1 is a schematic diagram of a wireless service environment illustrating the use of the present invention.

Turning now to FIG. 1, there is shown a schematic diagram of a wireless service environment illustrating the use and operation of the present invention. A typical wireless service environment consists of various coverage areas A,B,C. Coverage areas A and B each include at least one Base Station (BS) 10 belonging to a single wireless service provider. Each of the BSs 10 provide acceptable service as determined by subscription, as well as signal type, strength and quality of transmissions between a Mobile Station (MS) 12 and a BS 10.

Coverage area C is an area for which neither provider's BSs 10 provides acceptable service as determined by the subscription, as well as signal type, strength and quality of transmissions between a MS 12 and a BS 10. When MS $12_a$ is located in coverage area C, a dial tone would not be produced upon an origination attempt because no providers' BSs 10 provide acceptable service as determined by subscription, as well as signal type, strength and quality of transmissions between MS $12_a$ and any provider's BSs 10.

When the MS $12_b$ is located within coverage area A, as shown in FIG. 1, one and only one provider's BSs 10 provide acceptable service. Thus, upon an origination attempt, MS $12_b$ would produce a normal dial tone if and only if MS $12^b$ is registered to an account of a subscriber of the provider offering service via one or more BSs 10 in area A and/or software in MS $12_b$ defines the provider offering service as a "home" provider. The normal dial tone may consist of the standard dial tone frequencies, i.e., simultaneous and continuous 350 Hz and 440 Hz audible tones, or any other suitable dial tone. On the other hand, MS $12_b$ would produce a "roaming" dial tone upon an origination attempt if MS $12_b$ is registered to an account of a subscriber of a provider with a roaming agreement with the provider offering service via one or more BSs 10 in area A and/or software in MS $12_b$ defines the provider offering service as an acceptable "roaming" provider. The roaming dial tone is generally an easily differentiable variation of the standard, or normal, dial tone. As an example, the normal dial tone may be the standard simultaneous and continuous 350 Hz and 440 Hz audible tones, as mentioned above, while the roaming dial tone may correspond to a continuous 350 Hz tone and a cyclical 440 Hz tone. The 440 Hz tone may break for 50 milliseconds every two seconds, beginning at 450 milliseconds after onset of the dial tone. This short break is sufficiently long to be easily noticed by human users, while allowing automated dial tone detectors to function properly. Furthermore, this roaming dial tone may be detected by automated equipment, such as modems and facsimile machines.

Similarly, when MS $12_c$ is located in coverage area B, MS $12_c$ would produce a normal dial tone upon an origination attempt if and only if MS $12_c$ is registered to an account of a subscriber of the provider offering service via one or more BSs 10 in area B and/or software in MS $12_b$ defines the provider offering service as a "home" provider. Likewise, MS $12_c$ would produce a "roaming dial tone" upon an origination attempt if MS $12_c$ is registered to an account of a subscriber of a provider with a roaming agreement with the provider offering service via one or more BSs 10 in area B and/or software in MS $12_b$ defines the provider offering service as an acceptable "roaming" provider.

At the intersection of coverage areas A and B, two or more providers' BSs 10 provide acceptable service as determined by subscription, as well as signal type, strength and quality of transmissions between MS $12_d$ and two or more providers' BSs 10. In this case, upon an origination attempt, MS $12_d$ would generally produce a normal dial tone if and only if MS $12_d$ is registered to an account of a subscriber of the provider offering service via one or more BSs 10 in either area A or area B and/or software in MS $12_b$ defines the provider offering service as a "home" provider. MS $12_d$ would also obtain service from the subscriber's subscribed provider, i.e., the subscriber's "home" service provider. This is because MS $12_d$ contains a list of acceptable providers and their preference ordering. The preference ordering would, in general, prefer BSs 10 of the subscribed provider, i.e., the "home" BSs 10.

If, however, MS $12_d$ is not registered to an account of a subscriber of a provider offering service in either area A or B and/or software in MS $12_b$ defines the provider offering service as an acceptable "roaming" provider, then MS $12_d$ would produce a roaming dial tone upon an origination attempt. MS $12_d$ would then obtain service from the preferred, but not "home", provider according to a table look-up of acceptable providers as determined by subscription, as well as signal type, strength and quality of transmissions between MS $12_d$ and two or more providers' BSs 10.

Some exceptions to the above are possible under some circumstances. These exceptions include, but are not limited to, allowing user control actions to override MS 12 software-guided preferences, and allowing automated or manual provider system control actions that override MS 12 software-guided preferences and/or user control actions, e.g., traffic load or system outage management actions. Under these exception conditions, a normal dial tone is produced when the resulting attempt to originate a call is through BSs 10 that are part of the subscriber's subscribed or "home" system. Otherwise, a roaming dial tone is produced. The result for the user is immediate knowledge of whether origination may be expected to take place on the home or roaming systems with all resulting consequences, e.g., airtime rates, minute quota impacts, feature availability, etc.

Figure 2:
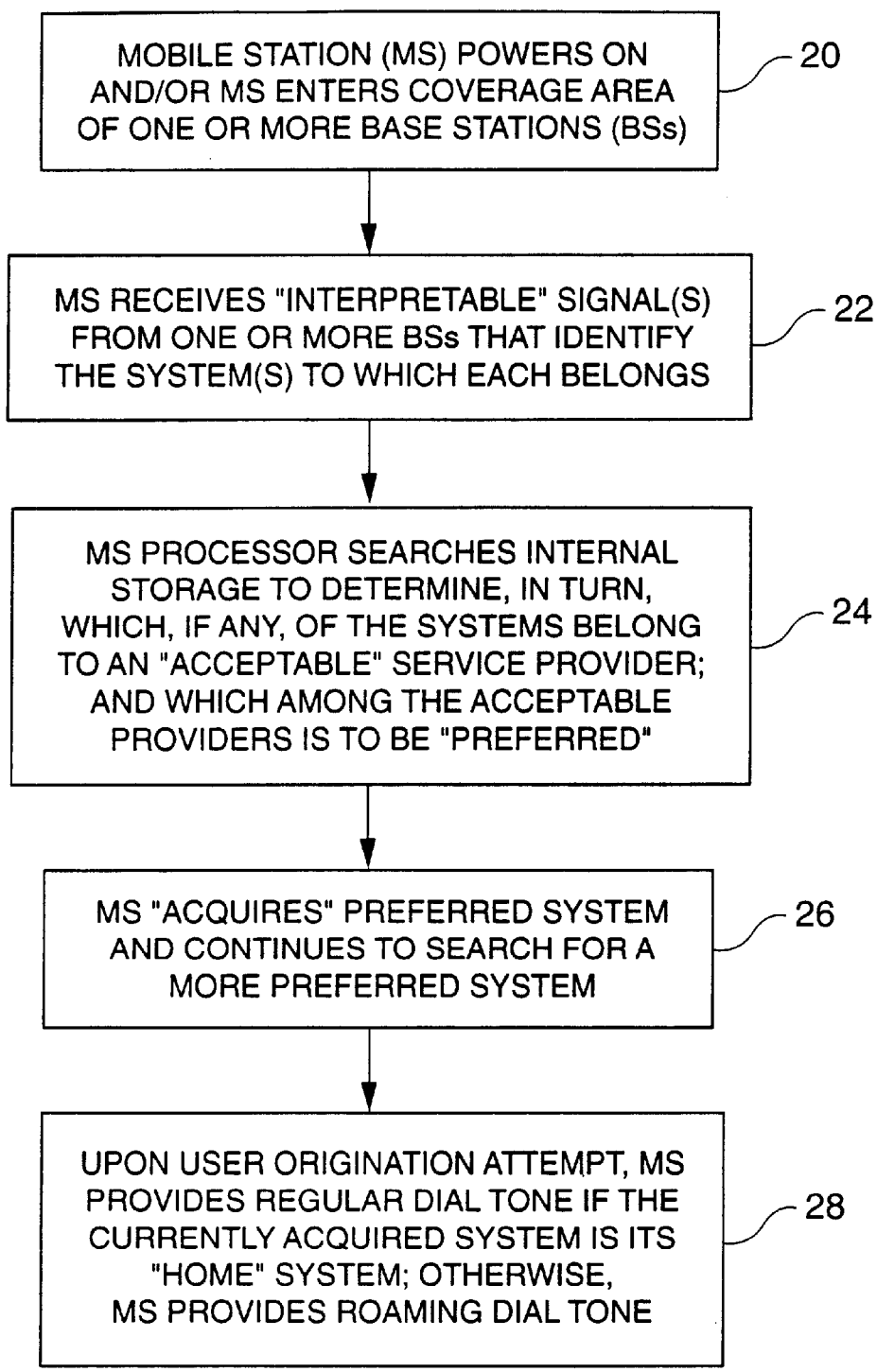
FIG. 2 is a flow diagram illustrating the general sequence of steps associated with the wireless service application of the present invention.

Turning now to FIG. 2, there is shown a flow diagram illustrating the general sequence of steps associated with the method of the present invention when utilized in the wireless service environment. The method begins with the MS 12 powering ON and/or entering a coverage area having one or more BSs 10, as shown at block 20. The MS 12 receives interpretable signal(s) from one or more BSs 10 that identify the system(s) to which each BS 10 belongs, as shown at block 22. An interpretable signal is a signal of compatible technology as the MS 12, having sufficient strength and recognizably coded.

Figure 3:
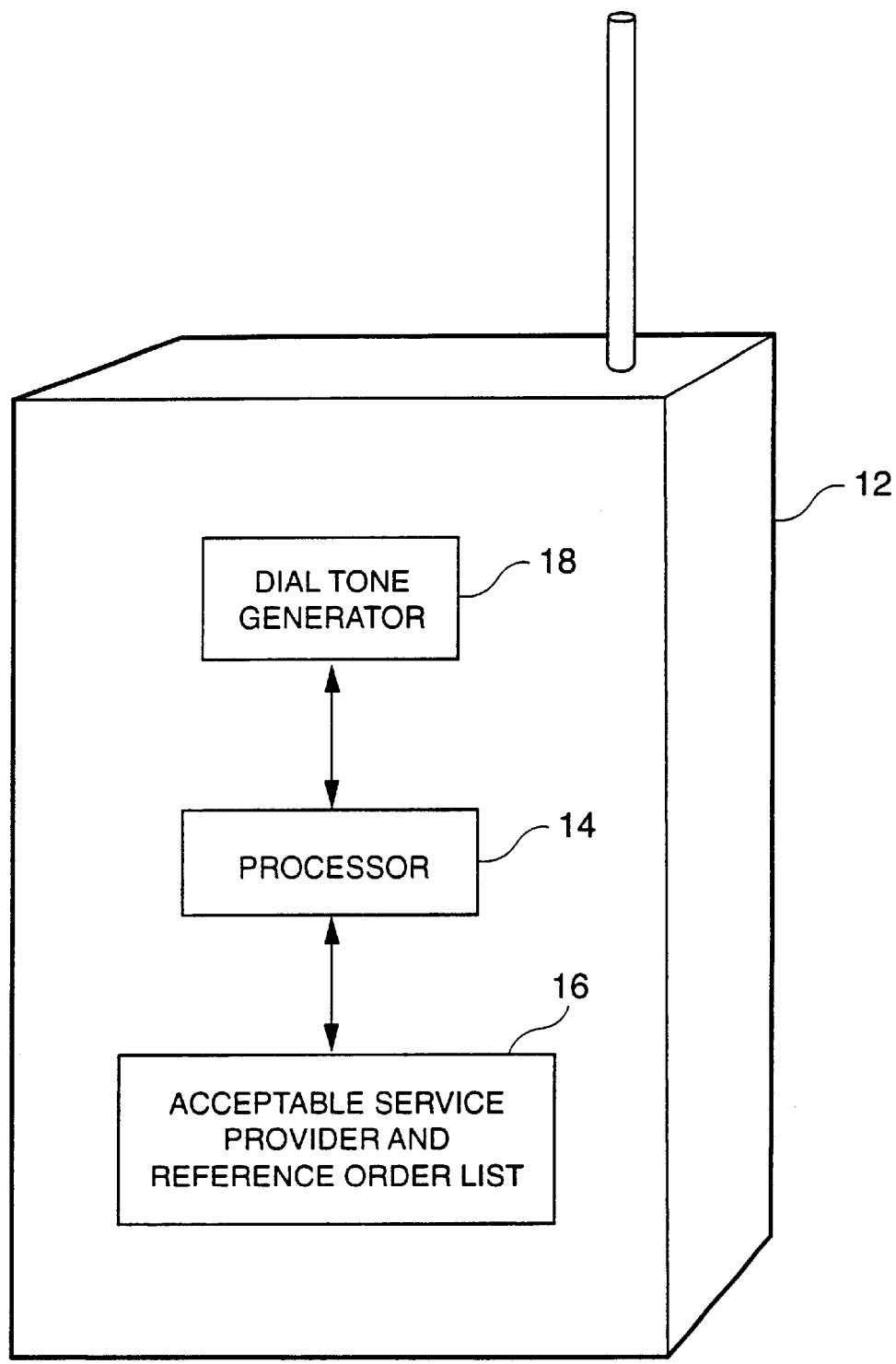
FIG. 3 is a block diagram of the hardware associated with a wireless telephone capable of generating the information-bearing audible tones of the present invention.

A processor 14 associated with the MS 12, FIG. 3, then searches an internal memory storage 16 to determine which, if any, of the systems belong to an acceptable service provider, as shown at block 24. An acceptable provider is identified as the system of a non-subscribed provider recognized as providing service of quality and on terms acceptable to the subscribed provider as programmed in the memory 16. Among the acceptable providers, a search is performed to determine the preferred provider.

Next, the MS 12 acquires the preferred system and continues to search for a more preferred system, as shown at block 26. Then upon a user origination attempt, the a dial tone generator 18 generates the normal dial tone if the currently acquired system is its "home" system, as shown at block 28. Otherwise, the dial tone generator 18 generates the roaming dial tone for receipt by the subscriber.

Figure 4:
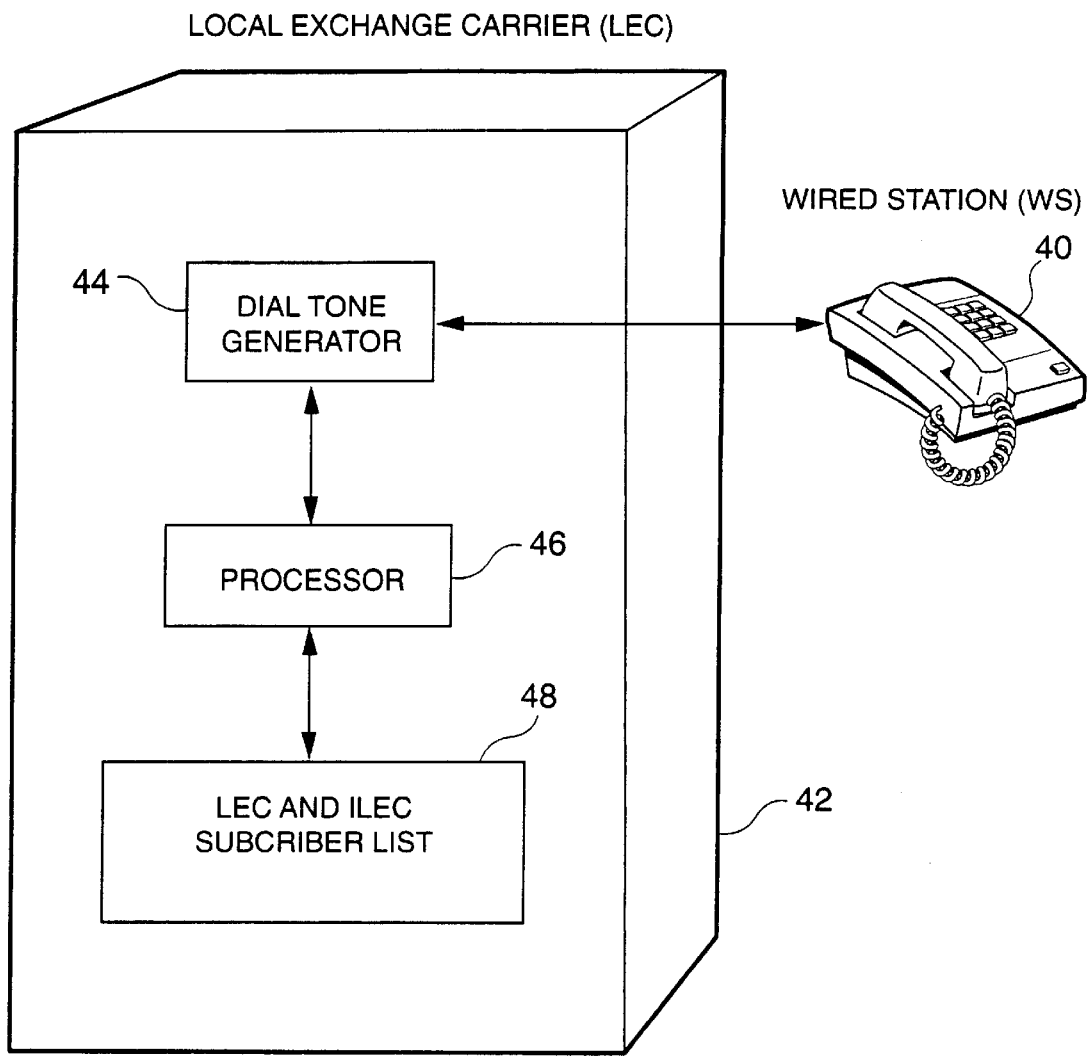
FIG. 4 is a block diagram of the hardware associated with a wireline telephone capable of generating the information-bearing audible tones of the present invention.

The present invention can also be utilized in conjunction with a wireline service environment. In this case, a wireline telephone 40, shown in FIG. 4, is continuously powered ON and physically connected to a wired termination of a facilities-based Local Exchange Carrier (LEC) 42. The LEC 42 is a local exchange services provider that owns or otherwise controls the physical facilities that provide local access telephone services, e.g., local central office switch, loop facilities, terminations, etc. The wired station (WS) 40 is connected to a dial tone generator 44 of the LEC 42, which is also in communication with a processor 46. The dial tone generator 44 generates either the normal dial tone or the "roaming" dial tone for receipt by the subscriber based on an instruction, or signal, from the processor 46.

The processor 46 is in communication with a subscriber list, or table look-up memory, 48. Memory 48 includes a list identifying whether the subscriber is a subscriber of the LEC 42 or of an Interconnected Local Exchange Carrier (ILEC). An ILEC is a local exchange services provider that leases or otherwise contracts for the use and operation of physical facilities owned or otherwise controlled by a LEC.

Prior to dialing by the subscriber, the WS 40 goes offhook. At this time a determination is made as to whether the wired termination of the WS 40 is subscribed to by either the LEC or the ILEC according to the memory 48. If the WS 40 wired termination is determined by the processor 46 to be subscribed to the LEC, the dial tone generator 44 generates the normal dial tone. On the other hand, if the wired termination is determined to be subscribed to an ILEC by the processor 46, then dial tone generator 44 generates the roaming dial tone.

Thus, in either environment, the subscriber can know whether service is being offered by their "home" service provider or by other "interconnected" or "roaming" service providers. The subscriber is then aware of any different available services, service control procedures or billing rates to be assessed the current call at the time of the call rather than at the time of receiving a communications bill.

While the best modes for carrying out the invention have been described in detail, those familiar with the art to which this invention relates will recognize various alternative designs and embodiments for practicing the invention as defined by the following claims. For example, the present invention is not limited to only two different dial tones. It should be appreciated by one skilled in the art that additional different dial tones may similarly be generated for receipt by the subscriber based on additional information. Such additional dial tones, however, is limited by the subscriber's ability to distinguish each of the dial tones from each other.

What is claimed is:

1. In a telephony system including a wireless telephony device, a method for transmitting a wireless call, comprising:

receiving an information signal from the wireless telephony system;

receiving a user initiated signal from the wireless telephony device indicating a desire to initiate a call from the telephony device;

based upon reception of the user initiated signal, the wireless telephony device processing the information signal in response to the user initiated signal to determine one or more characteristics of the service provider or telephony system; and generating an information-bearing signal indicating the one or more characteristics of the telephony system or service provider, wherein the information-bearing signal is detectable by automated equipment.

2. The method as recited in claim 1 wherein the wireless telephony system is a wireless communications system including a plurality of base stations for transmitting and receiving communications signals and wherein the wireless telephony device is a mobile station for transmitting and receiving communications signals to and from the plurality of base stations and wherein receiving the information signal includes continuously receiving the communications signals from at least one of the base stations.

3. The method as recited in claim 2 wherein the wireless telephony device processing the information signal includes:

processing the communications signals from at least one of the base stations to determine a provider identity of the at least one base station; and comparing the provider identity of the at least one base station to a list of providers stored in predetermined look-up memory.

4. The method as recited in claim 1 wherein the wireless telephony device processing the information signal comprises processing the information signal to determine if the desired call is associated with one of a first contract type or a second contract type, the second contract type being different from the first contract type.

5. The method as recited in claim 4 wherein generating an information-bearing signal comprises generating a first audible signal in response to the first contract type being associated with the desired call and generating a second audible signal in response to the second contract type being associated with the desired call.

6. The method as recited in claim 5 wherein generating the first audible signal includes generating the first audible signal continuously at a predetermined frequency and wherein generating the second audible signal includes generating the second audible signal periodically at the predetermined frequency.

7. The method as recited in claim 6 wherein generating the first audible signal includes generating a third audible signal and a fourth audible signal continuously at a second predetermined frequency and a third predetermined frequency, respectively, and wherein generating the second audible signal includes generating a fifth audible signal continuously at the second predetermined frequency and a sixth audible signal periodically at the third predetermined frequency.

8. The method as recited in claim 7 wherein generating the sixth audible signal includes generating the sixth audible signal at a predetermined time intervals separated by an absence of the sixth audible signal for a predetermined amount of time.

9. The method of claim 1, wherein the one or more characteristics of the telephony system or service provider comprise an indication of whether the signal strength of the information signal received from the telephony system is greater than a minimum level.

10. The method of claim 1, wherein the one or more characteristics of the telephony system or service provider comprise at least one of billing rate, available services, and service control procedures associated with the desired call.

11. The method of claim 1, wherein the one or more characteristics of the telephony system or service provider comprise whether the service provider is a primary service provider.

12. The method of claim 1, wherein the one or more characteristics of the telephony system or service provider comprise whether service is currently available from the system or service provider.

13. The method of claim 1, wherein generating the information-bearing signal comprises generating one of a plurality of audible tones.

14. The method of claim 13 wherein generating one of a plurality of audible tone comprises generating a first audible signal if the service provider or telephony system possesses one or more specified characteristics and generating a second audible signal if the service provider or telephony system does not possess the one or more specified characteristics.

15. The method of claim 13, wherein generating one of a plurality of audible tones comprises generating a first audible tone to indicate a first characteristic of the telephony system or service provider and a second audible tone to indicate a second characteristic of the telephony system or service provider.

16. In wireless telephony system including a wireless telephony device, a system for transmitting a wireless call, the system comprising:

means for receiving an information signal from the wireless telephony system;

means for receiving a user initiated signal from the wireless telephony device indicating a desire to initiate a call from the wireless telephony device;

a processor operative to process the information signal, based upon reception of the user initiated signal, in response to the user initiated signal to determine one or more characteristics of the telephony system or the service provider; and a signal generator, wherein the signal generator is operable to generate a signal indicating the one or more characteristics of the telephony system or the service provider, and wherein the signal indicating the one or more characteristics is detectable by automated equipment.

17. The system as recited in claim 16 wherein the wireless telephony system is a wireless communications system including a plurality of base stations for transmitting and receiving communications signals and wherein the wireless telephony device is a mobile station for transmitting and receiving communications signals to and from the plurality of base stations and wherein the means for receiving the information signal includes an antenna for continuously receiving the communications signals from at least one of the base stations.

18. The system as recited in claim 17 wherein the processor, in processing the information signal, is further operative to determine a provider identity of the at least one base station, and compare the provider identity of the at least one base station to a list of providers stored in a predetermined look-up memory at the mobile station.

19. The system as recited in claim 16 wherein the processor, in processing the information signal, is further operative to determine if the desired call is associated with one of a first contract type or a second contract type, the second contract type being different from the first contract type.

20. The system as recited in claim 19 wherein the signal generator is configured to generate a first audible signal in response to the first contract type being associated with the desired call and generate a second audible signal in response to the second contract type being associated with the desired call.

21. The system as recited in claim 20 wherein the signal generator, in generating the first audible signal, is further operative to generate the first audible signal continuously at a predetermined frequency and wherein the signal generator, in generating the second audible signal, is further operative to generate the second audible signal periodically at the pre-determined frequency.

22. The system as recited in claim 21 wherein the signal generator, in generating the first audible signal, is further operative to generate a third audible signal and a fourth audible signal continuously at a second predetermined frequency and a third predetermined frequency, respectively, and wherein the signal generator, in generating the second audible signal, is further operative to generate a fifth audible signal continuously at the second predetermined frequency and a sixth audible signal periodically at the third predetermined frequency.

23. The system as recited in claim 22 wherein the signal generator, in generating the sixth audible signal, is further operative to generate the sixth audible signal at predetermined time intervals separated by an absence of the sixth audible signal for a predetermined amount of time.

24. In a wireless telephony system including a wireless telephony device, a method for transmitting a call comprising:

receiving a user initiated signal from the wireless telephony device indicating a desire to initiate a call from the wireless telephony device;

receiving a transmitted information signal from said wireless telephony system;

accessing pre-stored data located in a memory element of the wireless telephony device in response to the user initiated signal;

processing the transmitted information signal and the pre-stored data to determine one or more characteristics of the service provider or the wireless telephony system; and generating an audible signal indicative of the one or more characteristics of the service provider or the wireless telephony system, wherein the audible signal is detectable using automated equipment.

25. The method of claim 24, wherein a first audible signal is generated if the service provider or telephony system possesses one or more specified characteristics and a second audible signal is generated if the service provider or telephony system does not possess the one or more specified characteristics.

26. The method of claim 24, wherein said pre-stored data comprises information relating to at least one of primary service providers, non-primary service providers, billing rates, available services, and service control procedures.

27. The method of claim 24, wherein the transmitted information signal comprises an indication of whether the selected service provider is a primary service provider.

28. The method of claim 24, wherein the transmitted information signal comprises an indication of whether the strength of the transmitted information signal is greater than a minimum level.

29. The method of claim 24, wherein the transmitted information signal comprises an indication of whether the traffic on the telephony system is below a certain maximum level.

30. The method of claim 24, wherein the transmitted information signal comprises and indication of whether the service provider or telephony system is currently available to transmit a call.

* * * * *